PULSE SIGNAL DETECTOR EMPLOYING A CONTROLLED DISCHARGING TIMING CIRCUIT TO PRODUCE AN OUTPUT PULSE AFTER A PREDETERMINED NUMBER OF INPUT PULSES

Filed Jan. 24, 1964

INVENTOR.
BERNARD J. REKIERE

BY C. A. Gulbrandsen

ATTY.

3,278,759
Patented Oct. 11, 1966

3,278,759

PULSE SIGNAL DETECTOR EMPLOYING A CONTROLLED DISCHARGING TIMING CIRCUIT TO PRODUCE AN OUTPUT PULSE AFTER A PREDETERMINED NUMBER OF INPUT PULSES

Bernard J. Rekiere, Addison, Ill., assignor to Automatic Electric Laboratories, Inc., Northlake, Ill., a corporation of Delaware Filed Jan. 24, 1964, Ser. No. 339,922
5 Claims. (Cl. 307—88.5)

This invention relates to a signal detector, and more particularly to an arrangement for detecting the presence of a pulse train on a line employing signaling by means of recurring pulses.

In many communication systems means must be provided to detect a certain condition, e.g. an off-hook or service condition on a given line. In pulse communication systems this means that it is necessary to determine the presence on the line of a series of pulses indicating this condition. However, this presents a problem for the reason that electrical noise or mechanical contact bounce might trigger the pulse detection circuit and give a faulty indication.

Therefore, the principal object of this invention is the provision of a circuit for detecting the presence of a train of pulses designating the existence of a predetermined condition of a line and that will not respond to electrical noise or mechanical contact bounce.

According to the invention, a pulse detector is provided using a transistor multivibrator in connection with two resistor-capacitor timing networks and two Schmitt trigger circuits. The transistor multivibrator is set by the train of input pulses, which causes the two timing networks to start. However, the first timing network discharges at a much greater rate than the second timing network and thereby causes the first Schmitt trigger circuit to generate an output to reset the transistor multivibrator before the next input pulse. Therefore, the capacitor of the second timing network does not fully discharge, but instead starts to charge during the time that the multivibrator is reset. However, each input pulse allows this second capacitor to discharge and recharge, with the net result that it progressively loses charge. When a given number of pulses have set the multivibrator and discharged the second capacitor to a certain level, then another Schmitt trigger circuit associated with the second timing circuit produces an output signal. Therefore, the output is generated only after a given number of input pulses are received in order to eliminate the possibility of generating an output in response to a few noise pulses or contact bounce.

The above-mentioned and other objects and features of this invention and the manner of attaining them will become more apparent, and the invention itself will be best understood, by reference to the following description of an embodiment of the invention taken in conjunction with the accompanying drawing wherein.

Figure 1:
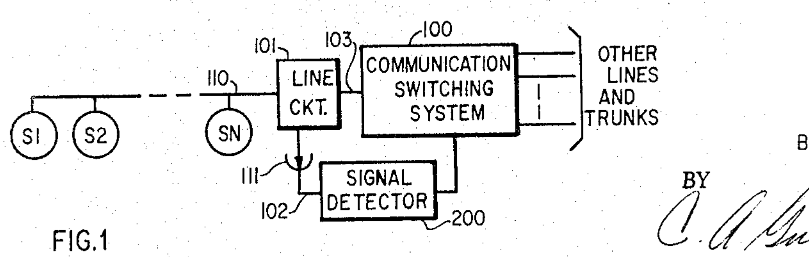
FIG. 1 is a communication switching system.

Referring now to FIG. 1, the signal detector 200 can be utilized in this pulse communication switching system. The system may, for example, be of a time division multiplex type. The signaling information signals, i.e., off-hook, dial pulse, etc., are transmitted to the signal detector over a path 102 that is separate from the voice path 103. The signaling information is sent in the form of a train of recurring pulses of relatively short duration for off-hook condition of a line. Each line 110 which may have a plurality of stations S1–SN has a line circuit 101, which is connected via path 103 to a unit 100.

The pulse train in one type of system may be generated at the stations S1–SN, or in another type system at line circuit 101. The signaling information pulse signals are supplied via multiplexing or connecting equipment represented symbolically by device 111, thence via path 102 to the signal detector 200.

Figure 2:
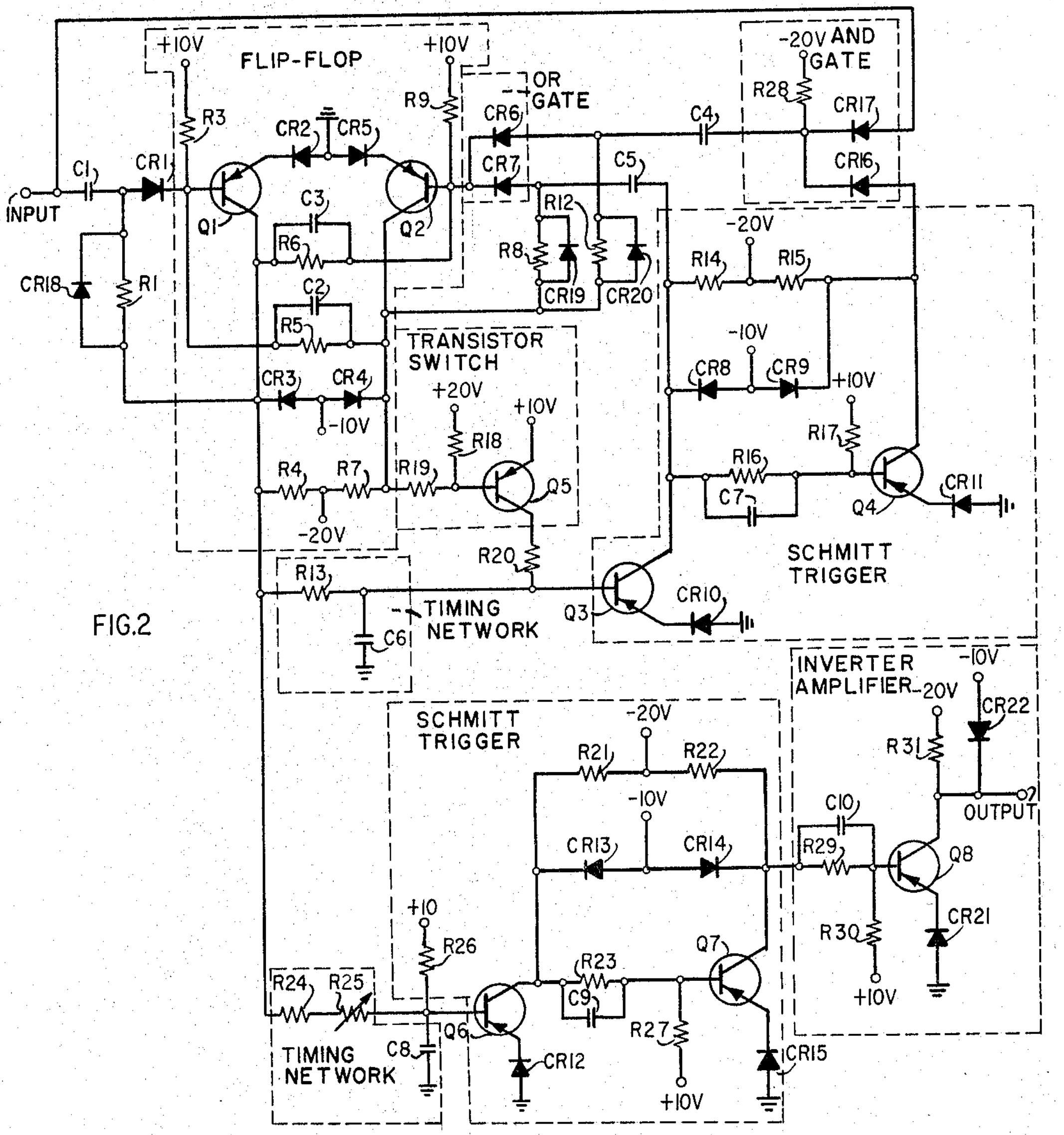
FIG. 2 is a schematic diagram of the pulse signal detector.

Referring now to FIG. 2, this pulse detector 200 comprises a flip-flop including transistors Q1 and Q2, a transistor switch including transistor Q5, a first Schmitt trigger circuit including transistors Q3 and Q4, a first resistance-capacitance timing network including resistor R13 and capacitor C6, a second Schmitt trigger circuit including transistors Q6 and Q7, a second timing resistance-capacitance network including resistors R24 and R25 and capacitor C8, an OR gate comprising diodes CR6 and CR7, an AND gate comprising diodes CR16 and CR17, and an inverter amplifier including transistor Q8.

After a number of pulses have passed through this circuit, the circuit produces a sharp edge and a change in the output level. This level is held for the duration of the pulse train and for a short time after the pulse train has stopped. The number of pulses that the circuit received, until it responds, is dependent upon the beta of the transistor in the trigger side of the Schmitt trigger. Potentiometer R25 has been added to compensate for any variation in beta. This detector circuit includes a gating arrangement used to start this circuit by automatically setting the flip-flop to the correct state in the event that when the power is turned on the flip-flop is in the wrong state. This provides for the correct sequence of operations for this circuit.

Part of this circuit can be used as a delay circuit. The length of the delay depends upon the value of the RC time constant. Delays from a tenth of a microsecond to several hundred microseconds have been observed.

Normally Q1 is conducting and Q2 is nonconducting. The output of Q1 taken from R4 (1500 ohms) is at ground and the output of Q2 taken from R5 (8200 ohms) is at −10 volts. When a positive pulse from −10 volts to ground is received at the input, Q1 is turned off and Q2 is turned on under normal flip-flop action. The output of Q1, now at −10 volts allows C8 (47 microfarads) to discharge from +2 volts to approximately −10 volts through R24 (2700 ohms) and R25 (600 ohms). However, as soon as this charge goes slightly below ground, Q6 will be forward biased and will turn on. The time for C8 to reach this level is considerably longer than the time constant of R13 (15,000 ohms) and C6 (.003 microfarad). Before a pulse was received, the output of Q2 was coupled to Q5 by R19 (4700 ohms). Q5 was held in saturation by the voltage divider arrangement of R19 and R18 (3300 ohms). This held a voltage of approximately 9.2 volts on C6 by the voltage divider of R13 and R20 (220 ohms). When the flip-flop was pulsed, the output of Q2 went to ground. This rise in output turned Q5 off by back biasing the base connection. This allows C6 to discharge to −10 volts through R13. In approximately 18 microseconds C6 has decayed to just below ground and forward biased Q3 turning it on. The output of Q3 raises from a −10 volts to ground. This positive rise is coupled through C5 (50 microfarads) and CR7 to the base of Q2 which resets the flip-flop. The output of Q2 drops to −10 volts turning Q5 on. C6 is rapidly charged back to +9 volts through R20 and Q5. Q1 was turned on when Q2 was turned off. The change in output of Q1 from −10 volts to ground starts C8 to charge back to +2 volts. However, in 2 microseconds another pulse in the input will reset the flip-flop again causing C8 to discharge to −10 volts for 18 microseconds when C6 will again turn Q3 on which resets the flip-flop. Each pulse will allow C8 to discharge for 18 microseconds and recharge for 2 microseconds, with the net result of C8 progressively losing charge. When a sufficient number of pulses have set the flip-flop and discharged C8 so that its charge is slightly negative, Q6 will be turned on by being forward biased by the potential on C8. Q7 will then be turned off by the voltage rise of Q6 coupled through R23 (8200 ohms) to the base of Q7. The negative drop of Q7 will be coupled through R29 (10,000 ohms) to the base of Q8 turning it on raising its output from −10 volts to ground. This circuit was designed to change its output upon the receipt of 25 pulses or for a period of 500 microseconds. A 600 ohm potentiometer (R25) is used to vary this period. It is also used to adjust the point in time during the 18 microsecond charging period that Q6 is turned on. It is adjusted such that Q6 turns on during the first half of the charging period. If Q6 would be turned on later in the cycle, the potential on C8 would become positive during the 2 microsecond recharging period and turn Q6 off. The output of Q8 would return to −10 volts until Q6 would turn on again. However, the output at Q8 remains on until the pulse train at the input has stopped and C8 charges to ground potential, thereby delaying turn-off of the output.

It may be noted that this system depends upon the state of Q1 when the input pulse is applied. In the event that the power is turned on and Q1 is in the nonconducting or off state, a positive pulse in the input would not change the state of Q1 and the circuit would not function. Diodes CR16 and CR17 and resistor R28 form a gate to correct this situation. If in the event that Q1 is off, Q4 will also be off. The output of Q4 is at −10 volts. The input to the system is also connected to the diode CR17. When the input level rises to ground CR17 goes further into conduction back biasing CR16 and raises the output, taken across R28, to ground. This rise is coupled through C4 (50 microfarads) and CR6 turning Q2 off and Q1 on. The system has now been reset to begin counting input pulses.

Diodes CR2, CR5, CR10, CR11, CR12, CR15, CR21, are protection devices for the base to emitter junction in their respective transistors. They assume, because of their high back bias impedance, the majority of a positive back bias voltage swing appearing at the base of these transistors.

While I have described above the principles of my invention in connection with specific apparatus, it is to be clearly understood that this description is made only by way of example and not as a limitation to the scope of my invention.

What is claimed is:

1. A detector for detecting the presence of a pulse train on a line employing signaling by means of recurring pulses, comprising:

a bistable device having a first and a second output and a first and a second input with said first input coupled to said line to set the bistable device to the first stable state;

a first timing means coupled to the second output of the device to generate a first timing interval, said first timing interval being relatively shorter than the repetition interval between said recurring pulses;

a control means coupled to the first output of the device to start the first timing means in response to the device set to the first state;

a first trigger means coupled to the first timing means and to said second input of said device to reset the device to the second state in response to the first timing means reaching the end of the first timing interval;

a second timing means also coupled to the second output of the device to generate a second timing interval in response to the device set to the first state at a first timing rate and in response to the device reset to the second state at a second timing rate and to generate a third timing interval in response to the second timing means operating at said second timing rate at the completion of said pulse train; and a second trigger means coupled to the second timing means to generate an output signal in response to the second timing means reaching the end of the second timing interval and in response to the second timing means operating at said first timing rate, and to remove said output signal in response to the second timing means reaching the end of said third timing interval whereby said second timing interval is determined by a given number of pulses from said pulse train.

2. A detector as claimed in claim 1, coincidence gating means to generate a coincidence signal in response to a pulse from said source and the first timing means reaching the end of the first timing interval; and further including alternative gating means coupled to said second input of said device to reset the device to the second stable state in response to said coincidence signal and alternatively to the first trigger means.

3. A detector as claimed in claim 2, wherein said first timing means and said second timing means each includes a resistance-capacitance timing network with a corresponding time constant and means coupling each said timing network to the second output of said device so that each said timing network discharges to the potential at the second output of said device in response to said device in said first stable state; and wherein said control means includes a transistor switch to couple charging current to said first timing means in response to said device reset to the second state for charging the resistance-capacitance network of said first timing means relatively faster than said first timing interval and to remove said charging current from said first timing means in response to said device set to the first state.

4. A detector as claimed in claim 3, wherein said bistable device is a transistor multivibrator;

and wherein the first and the second trigger means each comprises a Schmitt trigger circuit.

5. A detector as claimed in claim 1, wherein said first timing means and said second timing means each includes a resistance-capacitance timing network with a corresponding time constant and means coupling each said timing network to the second output of said device so that each said timing network discharges to the potential at the second output of said device in response to said device in said first stable state; and wherein said control means includes a transistor switch to couple charging current to said first timing means in response to said device reset to the second state for charging the resistance-capacitance network of said first timing means relatively faster than said first timing interval and to remove said charging current from said first timing means in response to said device set to the first state.

References Cited by the Examiner

UNITED STATES PATENTS

| | | | |
|---|---|---|---|
| 3,113,221 | 12/1963 | Okuda | 307—88.5 |
| 3,121,803 | 2/1964 | Watters | 307—88.5 |

ARTHUR GAUSS, *Primary Examiner.*

J. S. HEYMAN, *Assistant Examiner.*